(12) United States Patent
Nishio et al.

(10) Patent No.: US 6,781,563 B2
(45) Date of Patent: Aug. 24, 2004

(54) MULTIVISION DEVICE

(75) Inventors: Tadashi Nishio, Iruma (JP); Mitsuji Waki, Hachioji (JP); Akihiro Kubota, Kokubunji (JP)

(73) Assignee: Olympus Optical Co., Ltd., Tokyo (JP)

( * ) Notice: Subject to any disclaimer, the term of this patent is extended or adjusted under 35 U.S.C. 154(b) by 155 days.

(21) Appl. No.: 09/813,588

(22) Filed: Mar. 21, 2001

(65) Prior Publication Data

US 2001/0026247 A1 Oct. 4, 2001

(30) Foreign Application Priority Data

Mar. 24, 2000 (JP) ........................................ 2000-083674
Mar. 13, 2001 (JP) ........................................ 2001-070853

(51) Int. Cl.⁷ .............................................. G09G 5/00
(52) U.S. Cl. ........................................ 345/1.1; 353/30
(58) Field of Search .................. 345/1.1, 1.2; 348/744, 348/745, 746, 747, 749, 750, 840, 787–789; 353/30, 29, 31; 359/460, 449, 443; H04N 5/64, 5/65

(56) References Cited

U.S. PATENT DOCUMENTS

| 5,382,990 A | * | 1/1995 | Hata et al. ................... 353/94 |
| 5,822,002 A | * | 10/1998 | Tokoro et al. .............. 348/383 |
| 5,902,030 A | | 5/1999 | Blanchard |
| 5,956,000 A | | 9/1999 | Kreitman et al. |
| 6,017,123 A | * | 1/2000 | Bleha et al. .................. 353/30 |
| 6,081,375 A | * | 6/2000 | Furuya et al. .............. 359/460 |

FOREIGN PATENT DOCUMENTS

| JP | 5-316454 | 11/1993 |
| JP | 6-178327 | 6/1994 |
| JP | 6-284363 | 10/1994 |
| JP | 7-333727 | 12/1995 |
| JP | 8-82854 | 3/1996 |
| JP | 8-152677 | 6/1996 |
| JP | 8-154222 | 6/1996 |
| JP | 9-211386 | 8/1997 |
| JP | 9-326981 | 12/1997 |

* cited by examiner

Primary Examiner—Chanh Nguyen
(74) Attorney, Agent, or Firm—Frishauf, Holtz, Goodman & Chick, P.C.

(57) ABSTRACT

A multi vision device including a projection device constituted by an array of a plurality of projection units each including a rear projection projector and a housing to support the rear projection projector; and a screen located away from the projection device and displays pictures projected from the projection device. Pictures projected from the adjoining projection units overlap on the screen and are configured to form one picture on the screen. In this manner, highly accurate projected pictures are obtained with no borders between the pictures adjacent to each other. The height and width of the pictures projected onto the screen are greater than the height and width on the side of the projection device that faces the screen.

1 Claim, 14 Drawing Sheets

MULTIVISION DEVICE

This application claims benefit of Japanese Applications No. 2000-83674 filed in Japan on Mar. 24, 2000 and No. 2001-070853 filed in Japan on Mar. 13, 2001, the contents of which are incorporated by this reference.

BACKGROUND OF THE INVENTION

1. Field of the Invention

The present invention relates to a multivision device, and more particularly to a multivision device configured by stacking a plurality of projection units, which accommodate rear projection projectors, both horizontally and vertically, and that displays one large screen picture by enlarged projection of pictures projected from this multiplicity of projection units.

2. Description of the Related Art

As the size of screens in display units has increased in recent years, attention has been given to projectors that enlarge and project pictures on the screen.

An example of this type of projector is the liquid crystal projector that displays pictures based on video signals entered into a liquid crystal panel, enlarges these pictures, and projects them for display onto a screen. The liquid crystal projector is the most common type of display device because the display device is thin and light, it is driven by a low voltage, and has a low power consumption.

Recently, with the desire for larger screens, so-called multivision devices, which enable the display of large screen pictures by combining a plurality of the above projectors, have been put into use in corporate advertising and displays for various events.

Generally, a multivision device is configured either as a device comprising a plurality of projectors accommodated inside a cabinet and one screen, or as one projection unit comprising a projector and screen set. The so-called CUBE device is configured as a single projection device in which nine projection units are stacked in a three horizontal by three vertical (3×3) configuration.

In such multivision devices, the large screen display makes higher picture precision an issue requiring urgent attention and various proposals have been put forward regarding this.

To achieve highly precise pictures using multivision devices, it is important that the borders between adjoining pictures are as unobvious as possible. Proposals such as Japanese Patent Laid-open No. H6-178327, U.S. Pat. No. 5,956,000, and Japanese Patent Laid-open No. H9-326981 have been put forward to achieve this objective.

In the multivision devices of these proposals, parts of the pictures projected from adjoining projection units overlap each other and a single large picture is created by smoothing the image data in these overlapping sections. This method attempts to make borders between adjoining pictures less obvious.

Other proposals are shown in Japanese Patent Laid-open No. H8-82854 and Japanese Patent Laid-open No. H8-152677. In these proposals, screens are not provided for each of a plurality of projection units but rather, a plurality of screens is combined to create a large-scale screen unit. One large picture is created by placing this multiplicity of screens in front of horizontally and vertically stacked projection units. This attempts to make the borders between adjoining pictures less obvious.

Another proposal is described in Japanese Patent Laid-open No. H9-211386. In this proposal, light-adjusting material is placed between the projector and the screen in an attempt to reduce the amount of light in the overlapping sections. The result is that the borders between adjoining pictures are made less obvious.

Methods to obtain highly precise pictures by configuring a picture projection system using a multivision device have also been proposed. For example, there is the picture projection system proposed by this applicant and disclosed in Japanese Patent Laid-open No. H9-326981.

The picture projection system of this proposal comprises: a device for generating highly precise image data; an image projection device that has a plurality of projectors for projecting at least part of this highly precise image data; and an image processor that selects and processes at least part of this highly precise image data and sends it to the above multiplicity of projectors.

Such a picture projection system provides a projection method where the above image projection device is used to overlap parts of the pictures from each projector and create one large picture. In addition, the system uses the above image processor to process pictures so that the overlapping sections are joined smoothly. To enable this image processing to occur, the pictures projected onto the screen by each projector are photographed by a photographic device such as a digital camera and parameters, such as the position, colour, and brightness of each picture, are acquired. An image processor in a personal computer is then used to reference these parameters, process them into the original pictures and send them to each projector. In this way, by photographing the plurality of pictures as if they were one picture, smooth links between pictures are achieved and the precision of pictures is improved.

Proposals for technology to improve the precision of pictures are described, for example, in Japanese Patent Laid-open No. H6-284363 and U.S. Pat. No. 5,902,030. In these proposals, the optical axis of each projector has an offset so that it is not at a right angle to the screen. Projectors, each with a different offset direction, are arranged so that their projecting parts arranged above and below each other. By thus making it appear that they irradiate from one light source, the effects of differences in directivity around the borders of adjoining images, that is the unevenness in lighting, is mitigated.

Other technology is described in, for example, Japanese Patent Laid-open No. H5-316454, Japanese Patent Laid-open No. H8-154222, and Japanese Patent Laid-open No. H7-333727. In the proposal described in Japanese Patent Laid-open No. H5-316454, by providing a mechanism that can vary the position of projection units in a vertical direction within the housing in which they are accommodated, the main beams of light from the stacked projection units are all headed towards the viewer. This suppresses changes in the luminance of each screen.

In a proposal described in Japanese Patent Laid-open No. H8-154222, the housing that accommodates the projection units includes a mechanism for enabling variation in the vertical position of the projection units and a mechanism for enabling variation in the distance between the housing and the screen. When the size of the screen that will be combined with the projection units is selected, the vertical position of the projection units and the distance to the screen will be changed using these mechanisms in accordance with the selection. This enables fine adjustment of the screen size.

Furthermore, in the proposal described in Japanese Patent Laid-open No. H7-333727, the projection units can slide freely backwards and forwards within the housing in which they are accommodated. This means that during maintenance, the projection units can be easily removed, without removing anything else, and worked upon.

In Japanese Patent Laid-open No. H6-178327, U.S. Pat. No. 5,956,000, Japanese Patent Laid-open No. H9-326981, Japanese Patent Laid-open No. H8-82854, and Japanese Patent Laid-open No. H8-152677, technology is proposed for forming large, borderless pictures by overlapping parts of images projected from adjoining projection units.

However, in display units for displaying one large picture on a screen by stacking small projection units that are easily transportable, such as the CUBE multivision device, and enlarging the projection from each of these, it is difficult to create large, borderless pictures. Also, while there have been proposals to enable the creation of large pictures without joints by designing screens for multivision devices, these proposals required highly precise positioning because there are boundary sections between adjoining pictures. Also, any slight movement of the screen or projected light will cause the douser, which prevents adjoining projected light, to form a shadow so that a highly precise picture will not be attainable.

In, for example, the Japanese Patent Laid-open No. H9-211386 described above, there is a proposal relating to a location for light adjusting material. However, the problem here is that this cannot be applied when, for example, a CUBE multivision device configured from a combination of a plurality of projection units is used.

In the image projection system as disclosed in Japanese Patent Laid-open No. H9-326981 as described above, configuration of an image projection system using a multivision device enables more highly precise pictures to be obtained. However, this type of image projection system, as explained above, involves the combination of a plurality of units in a CUBE multivision device. Therefore, the light of the picture projected from a projector next to a projector attempting to take photographs for calibration makes it difficult to photograph the image patterns to be photographed normally. That is, the effect of the adjoining pictures means that the compensation function of this image projection system cannot be used effectively.

Next, Japanese Patent Laid-open No. H6-284363 and U.S. Pat. No. 5,902,030 provide proposals that cater for instances when projection units are combined in two horizontal and two vertical rows. However, the proposal does not cater for combinations of larger quantities. That is, these proposals do not cater for multivision devices. In the methods described in these patents, that is Japanese Patent Laid-open No. H6-284363 and U.S. Pat. No. 5,902,030, projectors with different offset directions are used. Therefore, all projection units used cannot be the same and thus the resultant device will be very expensive.

Furthermore, in the technology described in, for example, Japanese Patent Laid-open No. H5-316454, Japanese Patent Laid-open No. H8-154222, and Japanese Patent Laid-open No. H7-333727, a configuration with a mechanism that moves forwards and backwards within the projection units, a mechanism that moves up and down in a perpendicular direction, and a mechanism for slight angle changes is proposed. However, there is no reference to angle changes in a horizontal direction.

SUMMARY OF THE INVENTION

With the foregoing problems in mind, it is an object of the present invention to enable highly precise pictures with no visible borders between adjoining pictures by configuring a system so that adjoining pictures overlap on the screen to form one large screen picture.

A further object of the present invention is to provide a multivision device that can simply adjust the position of light adjusting material.

A still further object of the present invention is to provide a multivision device in which the effect of adjoining pictures is removed thereby allowing accurate calibration by an image projection system even when calibration photography is done using an image projection system.

An even still further object of the present invention is to provide a multivision device in which quality pictures are obtained as if projected from one light source by using a plurality of the same projection units and changing the direction of projections from the projectors inside the plurality of projection units in accordance with their position in a horizontally and vertically configured stack.

The multivision device of the present invention comprises: a projection device constituted by an array of a plurality of projection units each of which comprises a rear projection projectors and housing that supports this rear projection projector; and a screen, which is placed in isolation from the projection device and displays pictures projected from the projection device, and in this multivision device, pictures projected from adjoining projection units overlap on the screen to form one picture on the screen.

DESCRIPTION OF THE PREFERRED EMBODIMENTS

Aspects of the embodiment of the present invention will be explained using the diagrams for reference.

Figure 1:
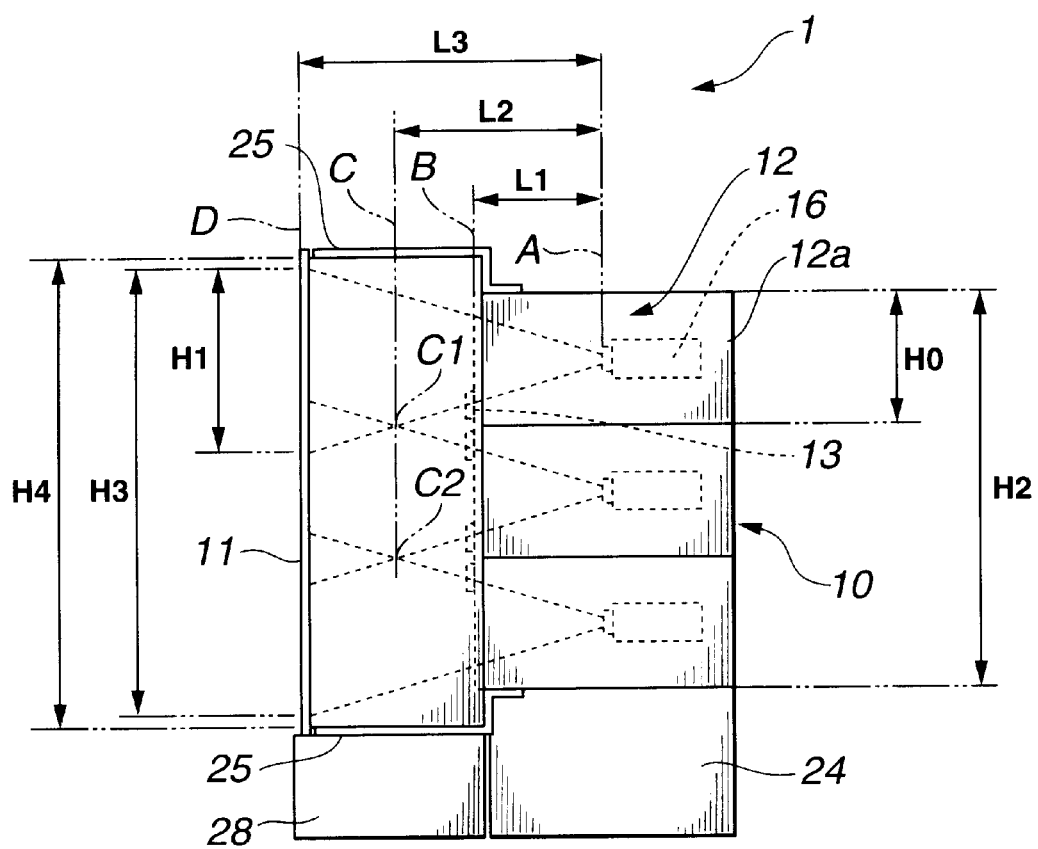
FIG. 1 shows a first aspect of the embodiment of the multivision device of the present invention and is a side view of a general example of the configuration of a multivision device of the present invention.
Figure 2:
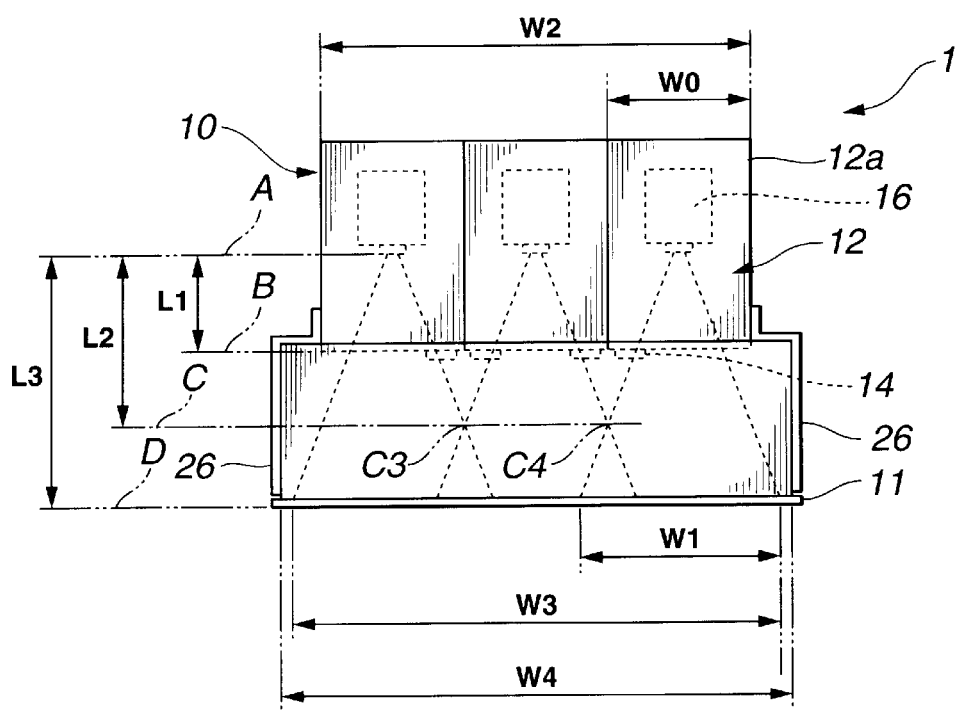
FIG. 2 is a plan view of a general example of the configuration of a multivision device of the present invention.
Figure 3:
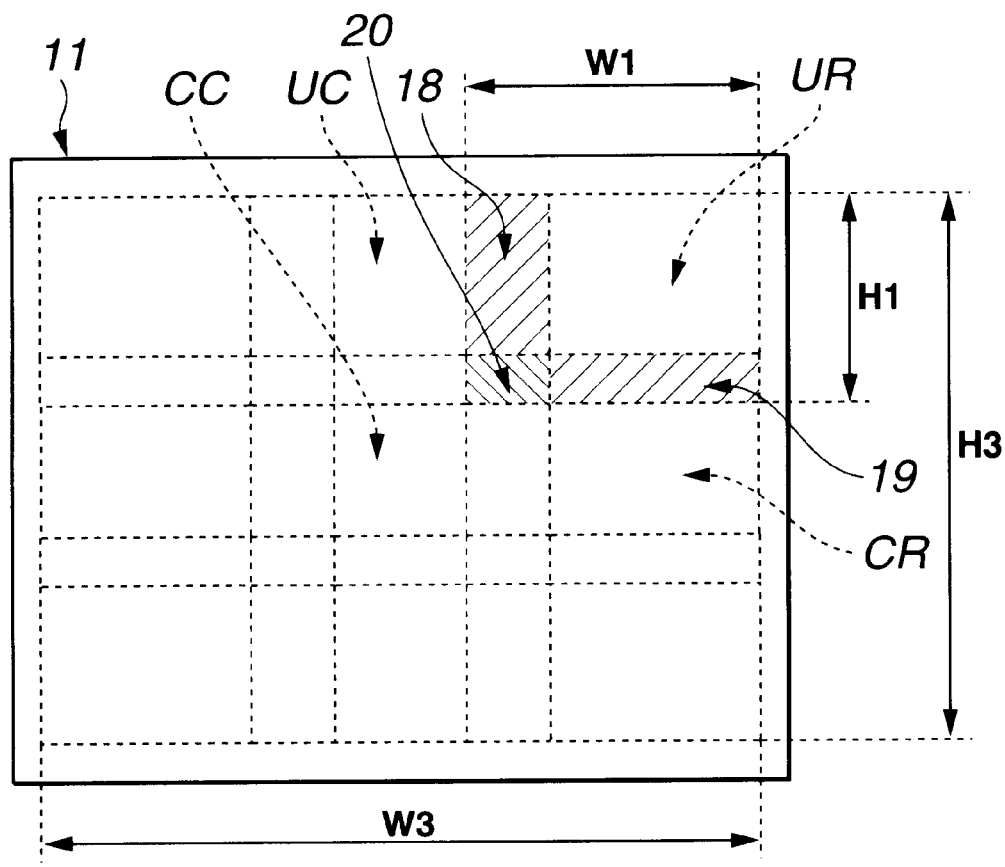
FIG. 3 is a front view of an example of a picture projected onto a screen by a multivision device of the present invention.
Figure 4:
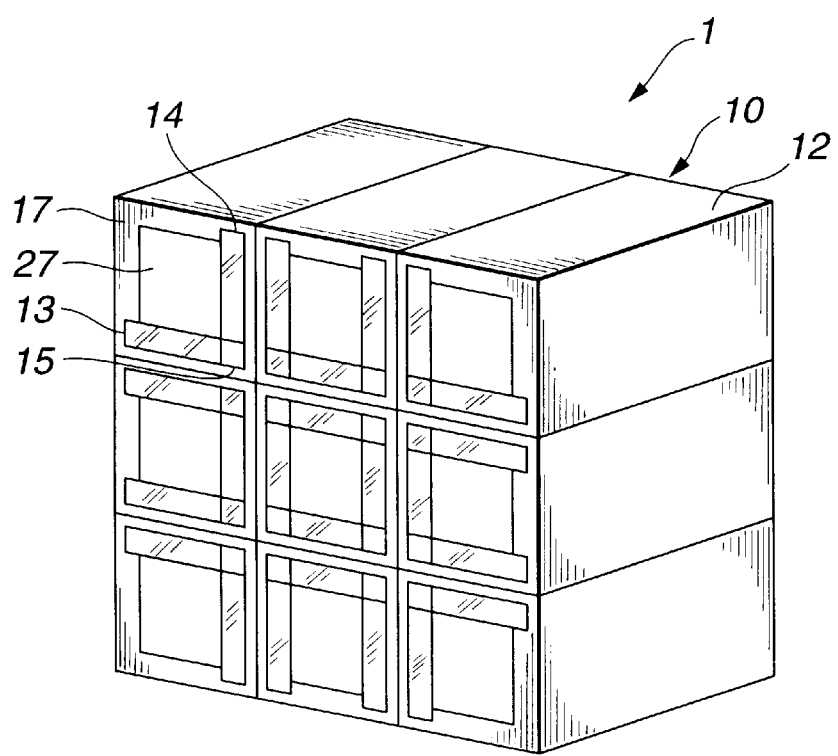
FIG. 4 is a perspective view of a multivision device in which a plurality of projection units have been stacked.
Figure 5:
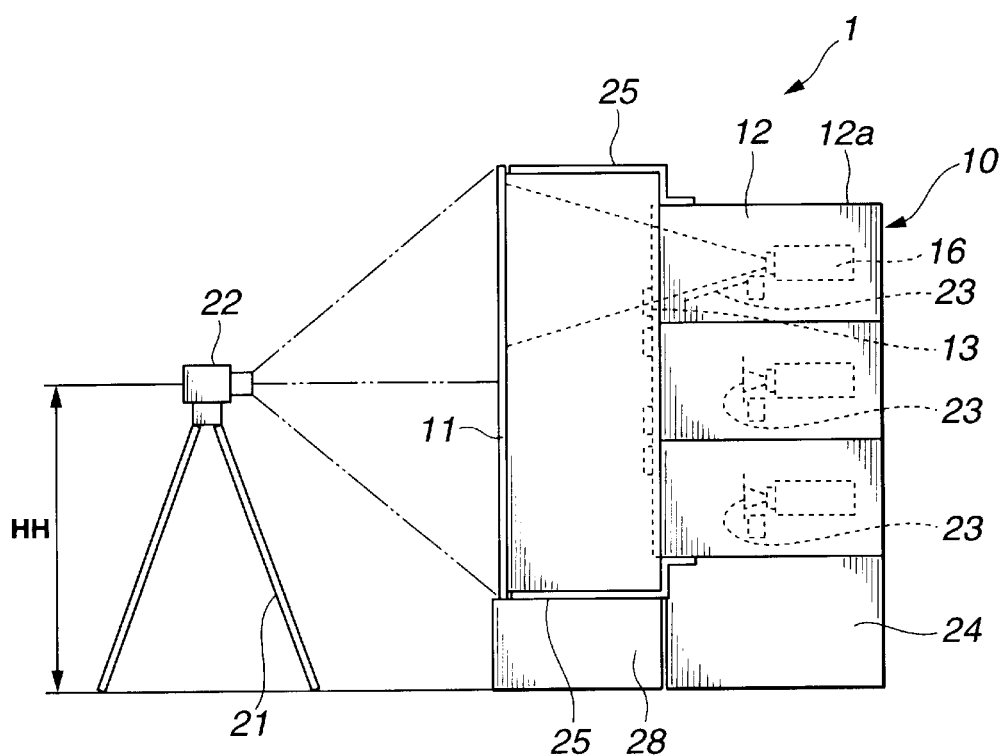
FIG. 5 is a schematic view of an example of the configuration of an image projection system used for calibration photography for the multivision device of FIG. 1.

Firstly, a first aspect of the embodiment will be explained. FIGS. 1 through 5 show a first aspect of the embodiment of a multivision device of the present invention. FIG. 1 is a side view of an example of the general configuration of a multivision device relating to the present invention. FIG. 2 is a plan view of an example of the general configuration of a multivision device relating to the present invention. FIG. 3 is a front view of an example of the general configuration of a multivision device relating to the present invention. FIG. 4 is a perspective view of an example in which a plurality of projection units are stacked in a multivision device. FIG. 5 is a schematic view of an example of the configuration of an image projection system when calibration photography is conducted for the multivision device of FIG. 1. In the figures, to simplify explanations, the only light beam shown is that for the featured optical system.

As shown in FIGS. 1 and 2, the multivision device 1 comprises a projection device 10, screen 11, light-reducing members 13 and 14, support members 24 for supporting the projection device 10, positioning members 25 for positioning the screen 11 and projection device 10, and a stand 28. The projection device 10 is configured with a plurality of projection units 12, which are made up of rear projection projectors (hereinafter abbreviated to projectors) 16 and housing 12a that supports these projectors 16, that are arranged both horizontally and vertically. The screen 11 is placed in isolation from this projection device 10 and displays the pictures projected from the projection device 10. A plurality of light-reducing members 13 and 14 are placed in front of the projection units 12 to reduce the amount of projected light. In FIG. 1, only the light-reducing member 13 is shown and in FIG. 2, only the light-reducing member 14 is shown. The stand 28 is provided in combination with the support members 24. The screen 11 and positioning members 25 are mounted on the stand 28.

In this aspect of the embodiment, nine box-like projection units 12, known as CUBEs, are shown configured as a CUBE multivision device in which three are placed horizontally and three vertically (3×3). However, in the projection device 10 projection units 12 can be combined in any n×n (n=2, 3, 4, . . . ) vertical and horizontal combination.

For example, in this type of multivision device 1, input signals are split into nine (=3×3) using an image splitting means not shown in the diagram. These are enlarged or reduced as appropriate to suit the resolution of the projectors 16 in the projection units 12. By sending these split image signals to the corresponding projectors 16 within the projection units 12, one large picture is projected onto the one screen 11.

The configuration and actions that are characteristic of this aspect of the embodiment are explained first in relationship to the vertical direction and then in relationship to the horizontal direction.

The multivision device 1 in this aspect of the embodiment comprises, as shown in FIG. 1, three projection units 12, which are stacked vertically, containing projectors 16 as explained above.

The screen 11 above, is a large transparent screen created from one piece of material with no joints. It is installed at a distance in front of the aforementioned projection device 10 so that it displays the pictures projected from projectors 16 in the projection units 12.

In this aspect of the embodiment, the vertical length of projection unit 12 housing (hereinafter referred to as the height) H0 is made less than the height H1 of the picture projected onto the screen 11 from the projectors 16, so that adjoining pictures overlap one another on the screen 11. That is, the housing 12a of the projection units 12 is configured and the vertical position of the projectors 16 in the projection unit 12 positioned to satisfy the relationship in Equation (1).

$$H0 < H1 \tag{1}$$

Also, position B at the front of the housing 12a of a projection unit 12 is closer to the projectors 16 than position C on the plane that includes points C1 and C2, points at which lights from adjoining projection units first overlap.

In this instance, in FIG. 1, if A is the position at the end of the projection lens on projector 16, B is the position at the front of a projection unit 12, C is a position at which the lights projected from adjoining projection units 12 first intersect, D is the position of the screen 11, L1 is the distance between A and B. L2 the distance between A and C, and L3 the distance between A and D (that is the focal distance during projection from projectors 16), the relationship between these distances is as shown in Equation (2).

$$L1 < L2 \text{ and } L2 < L3 \tag{2}$$

Accordingly, position B at the front of the projection units 12 is defined by this Equation (2).

In this aspect of the embodiment, if a multivision device 1 is configured with all the elements to satisfy the aforementioned Equation (2), the height H2 of the entire projection device 10, which is a group of projection units 12, is lower than the total height H3 of the picture. In this aspect of the embodiment, supporting members 24 are provided to adjust the height. By placing the projection device 10 on top of these supporting members 24, the height of these supporting members 24 is used to adjust the differential between the total height H3 of the picture and the total height H2 of the projection device 10, that is to adjust the height of the projection device 10.

Also, to accurately maintain the distance between the screen 11 and the projection units 12 (L3-L1), the positioning members 25 as shown in FIG. 1 are fixed onto the projection device 10 or the supporting members 24. By using arms or rods fixed onto the framework both high and low as the positioning members 25 to support the framework of the screen 11 both high and low, a constant distance between the screen 11 and projection units 12 can be maintained. Furthermore, these positioning members 25 do not necessarily have to be these types of members but can also be configured using outer casing (such as framework members) or a douser, which prevents the infiltration of outside light or leakage of light between the screen 11 and projection units 12. These can also perform a positioning function in the same way. The stand 28 on which the aforementioned positioning members 25 and screen 11 are mounted and which is used to adjust their height, is placed in front of the aforementioned support members 24 as shown in FIG. 1.

In conventional multivision devices, the height H3 of the picture projected onto the screen and the height H2 of the stacked projection units 12 (height of the projection device) are substantially the same. However, the present invention is configured so that the spacing H4 between positioning members 25 is always greater than the total height H2 of the stacked projection units 12 (height of projection device 10). In other words, the relationship between H2 and H4 satisfies Equation (3).

$$H4 > H2 \qquad (3)$$

This aspect of the embodiment of the present invention is configured so that the relationship in Equation (3) above is satisfied by the projection units 12, the aforementioned support members 24, the positioning members 25, and the stand 28.

The horizontal configuration of the multivision device 1 of this aspect of the embodiment is shown in FIG. 2. Three projection units 12 that contain projectors 16 are placed together side by side.

As described above, the screen 11 is placed in isolation from the front of the aforementioned projection device 10 so that it can display the pictures projected from the projectors 16 inside the projection units 12.

Here, the horizontal length (hereinafter referred to as the width) W0 of the housing 12a of the projection units 12 is made less than the width W1 of the pictures projected to the screen 11 from the projectors 16, thus ensuring that adjoining pictures also overlap horizontally on the screen 11. That is, the housing 12a of the projection units 12 is configured to satisfy the relationship of Equation (4) and horizontal positioning of the projectors 16 within the projection units 12 also occurs.

$$W0 < W1 \qquad (4)$$

Also, position B at the front of the housing 12a of the projection units 12 is as explained in FIG. 1. That is, position B at the front of the housing 12a of a projection unit 12 is closer to the projectors 16 than position C on the plane that includes points C3 and C4, points at which lights from adjoining projection units first overlap.

As described above, positioning members 25 are installed vertically to accurately maintain the distance between the screen 11 and projection units 12 (L3-L1) and, in the same way, positioning members 26 are installed horizontally and fixed in the projection device 10.

As described above for the vertical direction, these positioning members 26 can implement positioning to maintain a constant distance between the screen 11 and projection unit 12 by fixing arms or rods to the framework of the screen 11 on the left and right. Furthermore, positioning members 26 are not restricted to these and can, for example, be configured using outer casing (for example, framework members) or a douser, which prevents the infiltration of outside light or leakages of light between the screen 11 and projection units 12. In these instances, they can perform a positioning function that is similar to that performed in the vertical direction.

In conventional multivision devices, the width W3 of the picture on the screen and the total width W2 of the projection units 12 (width of projection device 10) is substantially the same. However, in the present invention, the spacing W4 of positioning members 26 is always greater than the total width W2 of the projection units 12 (width of projection device 10). In other words, the relationship between W2 and W4 satisfies Equation (5).

$$W4 > W2 \qquad (5)$$

This aspect of the embodiment is configured so that the projection units 12 and positioning members 26 satisfy the relationship expressed in Equation (5).

When a multivision device 1 of this configuration is seen from the screen 11, pictures are projected in a three vertical by three horizontal matrix as shown in FIG. 3.

Here, adjoining projected images overlap and so, for example, the upper right picture UR forms an overlap 18 with the upper center picture UC and, on the lower side, an overlap 19 with the right center picture CR. Furthermore, an overlap 20 with the center center picture CC, which is to its bottom left, is also formed. This means that an overlap is formed by the three adjoining projected images, the upper center image, center center image and right center image. Thus, the pictures projected from the plurality of projection units overlap on the screen and it is in this status that one picture is presented on the screen 11.

In liquid crystal projectors or Digital Light Processing (trademark) (DLP) (trademark) projectors, even when attempts are made to make black images, the projected light cannot be completely cut because of light leaking through the liquid crystal or reflected light around the Digital Micromirror Device (DMD) element. Accordingly, the problem arises that when there are overlapping sections as in the present invention, the slight leaks of light in a black picture are added in the overlapping sections and thus these appear brighter than other areas in the picture.

To solve such problems, light-reducing members for reducing the amount of projected light are installed in the light path and the amount of light in the overlaps reduced. In the multivision device 1 of this aspect of the embodiment, a plurality of light-reducing members is installed in front of the projection units 12. These reduce the amount of projected light corresponding to the overlaps and are configured so that a projected picture with even brightness can be obtained.

A specific example of the installation of the aforementioned light-reducing members will be explained with reference to FIG. 4.

The multivision device 1 of this aspect of the embodiment, as shown in FIG. 4, is configured with stacked projection units 12. In front of the projection device 10, which consists of this multiplicity of projection units 12, a plurality of light-reducing members 13 and 14, which have the prescribed optical properties in both the vertical and horizontal directions, is installed to obstruct part of the light path in the side views shown in FIGS. 1 and 2.

For example, as shown in FIG. 4, openings 27, which do not obstruct the light projected from the projectors 16, are provided in front of each projection unit 12. Mounting plates 17 are made around these openings 27 in front of the projection units 12. The horizontal light-reducing member 13, vertical light-reducing member 14, and adjusting material 15 that has an optical adjustment property for four overlaps are mounted on these mounting plates 17 that surround the openings 27, so that their mounting position can be adjusted.

These light-reducing members 13, 14, and 15 are either provided all around an opening 27 to obstruct the projected light passing through a part of the opening 27 or on two or three sides of the opening 27 depending on the position in which the projection unit 12 is stacked. Light-reducing member with an optical characteristic to suit the position of that light-reducing member is installed.

Adjustment of the mounting position of each light-reducing member will be explained next. When the positions in which each projection unit 12 will be placed in a stack is predetermined, prior to installation, light-reducing members 13, 14, and 15 are fixed so they can be adjusted. In the present invention, because there is space between the screen 11 and front of the projection units 12, even after stacking in horizontal and vertical directions, workers can easily adjust the positions in which each of the materials is mounted. That is, in the present invention, by installing light-reducing member in front of the projection units 12 where its position can be adjusted, the positions of the light-reducing members can be easily adjusted after installation. Accordingly, in view of the method of installation, fine adjustment of the mounting position of light-reducing member need not be done at the time of installation. Another advantage of this method is that even in cases where units cannot be stacked well because of unavoidable obstructions such as lumps or dents in the floor, adjustment of the mounting position after installation can be used to counteract positioning problems.

Some examples of light-reducing member that can be used in this aspect of the embodiment are glass or transparent acrylic plate, through which transmitted light changes smoothly. The effects can still be exhibited even when non-transparent material that completely cuts off light, for example sheet metal, is used.

Figure 4A:
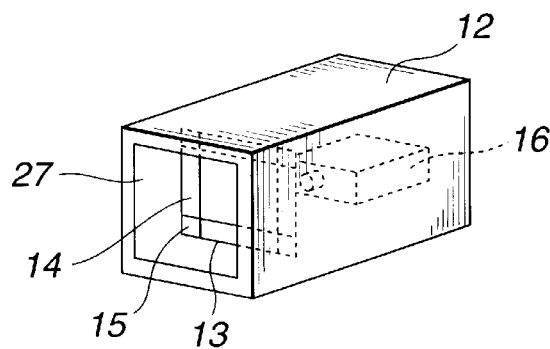
FIG. 4A is a perspective view of an example in which light-reducing member is provided inside the projection units of a multivision device.
Figure 4B:
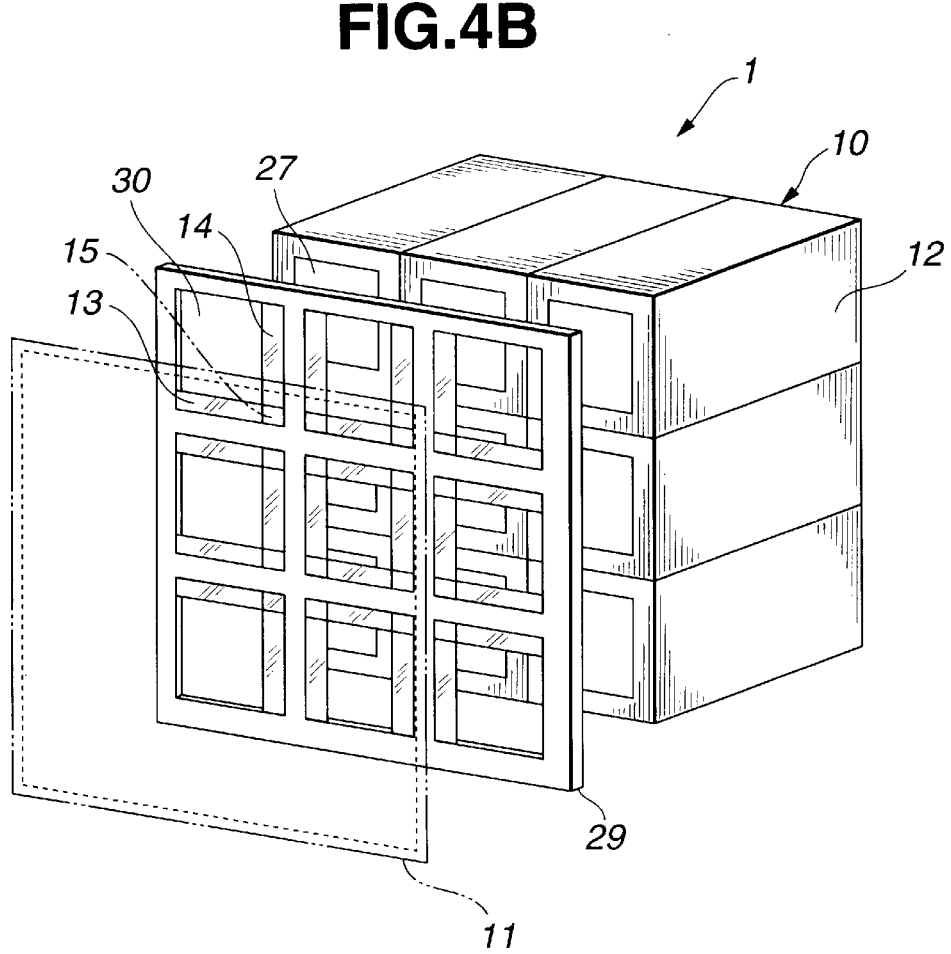
FIG. 4B is a perspective view of an example in which a separate light-reducing member unit is provided between the projection device and the screen.

Either of the methods used in FIG. 4A or 4B can be used to install light-reducing member. FIG. 4A is a perspective view of an example in which light-reducing member is installed inside the projection units 12 of a multivision device. FIG. 4A shows one of the projection units 12 inside a multivision device. In FIG. 4, light-reducing member is installed in the opening 27 of a projection unit 12 but in FIG. 4A, light-reducing members 13, 14, and 15 are fixed in the projection unit 12 between the projector 16 and opening 27 by a means not shown in the figure. Each of the light-reducing members is fixed in a position like that in FIG. 4 so that the amount of light in the overlapping sections of the pictures projected from the projectors 16 can be adjusted. The materials can be pre-fixed to suit the way in which each projection unit is installed, can be fixed manually. Alternatively, a drive means such as a motor can be used to enable the materials to be mobile both vertically and horizontally. As shown in FIG. 4, the light-reducing members are installed where necessary on the top, bottom, left, or right sides of the openings 27 to suit the position of each projection unit 12. Light-reducing member is installed on all four sides of the opening 27 in the projection unit 12 shown in FIG. 4A and so this is means that this projection unit is the central one in FIG. 4.

FIG. 4B is a perspective view of an example in which a separate light-reducing member unit 29 is installed between the projection unit 10 and the screen 11. A plate-like light-reducing member unit 29, which incorporates light-reducing members, is installed between the projection device 10 and the screen 11. The light-reducing members unit 29 has nine openings 30 for the light projected from the nine openings 27 in the nine projection units 12. The projected light that passes through each opening 30, generates a picture on the screen 11. The light-reducing members 13, 14, and 15 are fixed into positions around each opening 30 so that the light in the overlapping sections of the pictures projected from projectors 16 will, as in FIG. 4, be adjustable. In other words, light-reducing members for adjusting the amount of light from projection units 12 are installed together in this unit 29. If the light-reducing members unit 29 is fixed using a slide mechanism not shown in the diagrams, the light-reducing members unit 29 can slide in a horizontal direction (or vertical direction) to the outside of the projection device 10, thus enabling adjustment of the position of each of the different light-reducing members.

Next, an example of a system configuration used when implementing calibration photography for a multivision device 1 of the present invention will be explained with reference to FIG. 5.

Even when implementing calibration photography, the multivision device 1 of the present invention can effectively use the calibration function provided by the image projection system installed for calibration.

The image projection system generally used for calibration is the image projection system described, for example, in Japanese Patent Laid-open No. H9-326981. Calibration is done using a system configuration substantially the same as that image projection system. That is, in this aspect of the embodiment, the system configuration includes the multivision device 1 of the present invention, a photographic device 22 for photographing the plurality of pictures that are projected onto the screen by the plurality of projectors 16 in the device 1, and an adjusting device (not pictured) for adjusting projection conditions for the aforementioned multiplicity of projectors based on image data obtained from the photographic device 22.

Here, control by an adjusting device such as a personal computer is used to project an adjustment display pattern from each projector 16 onto the screen 11. Photographic image data is then obtained when this pattern is photographed by a photographic device 22, such as a digital camera, or when the colour is measured using a calorimeter. This photographic image data is provided to the adjusting device (not pictured).

The photographic device 22 is positioned facing the screen 11 of the multivision device 1 in a typical user viewing position and is set up so that it can photograph an area (photographic range) that includes the entire screen 11. Here, the height of the photographic device 22 is a viewer's eye level. A tripod 21 can be fixed to the photographic device 22 to keep it at that height HH. A tripod 21 need not be used to maintain the height. A specialist stand could also be used.

The adjusting device uses an internal image processing means to utilize the photographic image data provided and calculate parameters for adjustments and correction, such as image positioning, colour matching, and brightness matching. The adjusting device converts the original image data based on the calculated parameters and adjusts the input image signals sent to each projector 16. Each projector 16 then projects a picture based on these adjusted signals. This produces highly precise projected pictures with the resolution of the input pictures.

In this aspect of the embodiment, shutter members 23 are installed in front of the projector lenses of the projectors inside each projection unit as shown in FIG. 5 to enable effective calibration.

In other words, when implementing calibration photography for correcting pictures projected from projection units 12, to remove the effect of the pictures projected from adjoining projection units 12, those other projected pictures are temporarily obstructed using the aforementioned shutter member 23. FIG. 5 shows a situation in which shutter members 23 corresponding to projection units 12 on the center and lower levels are working when photographs of the pictures projected by the upper projection units 12 are being taken by the photographic device 22. These two shutter members 23 act and forcibly obstruct irradiation of the pictures projected from the corresponding projection units 12 and only the picture projected from the upper projection unit 12 irradiates. That is, in this aspect of the embodiment, the picture projected onto the screen 11 is not photographed and adjusted at the same time but is rather photographed and adjusted partially using shutter members.

Examples of the mechanism used for shutter members 23 include a mechanism that uses a motor to move a shutter member 23 in and out of the light path, and a mechanism that uses a solenoid to open and close a shutter. In other words, if this type of shutter member did not exist, the power for each unit would have to be turned off in turn. Once the power is turned off, a few minutes is required until a unit is powered up again and approximately 30 minutes is required before the light source is stable. This means that a number of hours would be required for calibration. Thus, loss time is prevented by adopting this type of shutter mechanism and calibration can be completed in a few minutes.

Operation of the shutter members 23 above is controlled by an adjusting device, such as the aforementioned personal computer, and is also automatically controlled by the aforementioned adjusting device during calibration of the multivision device 1 of this aspect of the embodiment.

Accordingly, in this aspect of the embodiment, stacking of projection units with housings that are smaller than the projected picture means that adjoining projected pictures will always overlap. Image processing of those overlapping sections produces a highly precise projected picture with no joints. Whether or not light-reducing members 13, 14, and 15 are mounted on a projection unit 12 depends on the vertical and horizontal position in which that projection unit 12 is stacked. The need to mount light-reducing members 13, 14, and 15 is determined for each projection unit depending on the vertical and horizontal position of that projection unit in the stack. Also, the mounting position of light-reducing members 13, 14, and 15 on the mounting plates 17, which have the openings 27 for the projected light and which are installed at the front of the projection units 12, can be adjusted. Accordingly, even after projection units 12 are stacked in both directions, that is horizontally and vertically, the mounting position of the light-reducing members can be simply adjusted. Also, by installing a shutter member 23 within each projection unit 12 to temporarily obstruct the light projected from the projectors 16, all pictures projected from projectors 16 other than the one being targeted in calibration photography can be cut. Therefore, projected light other than that targeted by the photography does not enter and accurate calibration photography can occur.

Next, a second aspect of the embodiment will be explained.

Figure 6:
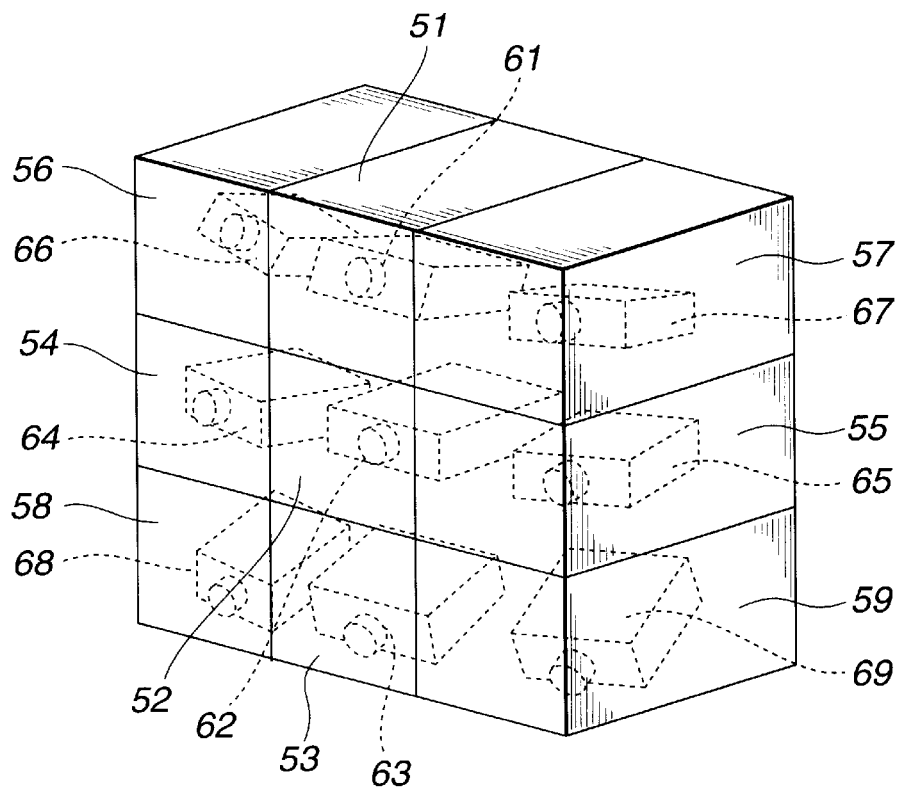
FIG. 6 shows a second aspect of the embodiment of a multivision device of the present invention and is a perspective view of the general configuration of a multivision device in which each projector includes a drive device for enabling adjustment of position and angle in both horizontal and vertical directions.
Figure 6A:
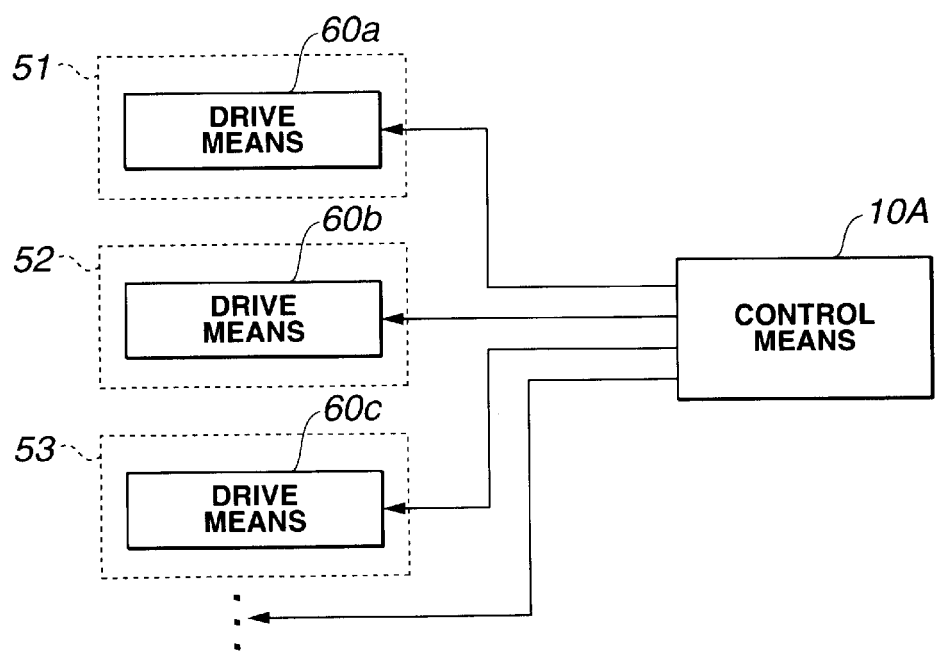
FIG. 6A is a block diagram showing the configuration of part of an electrical circuit that includes a drive unit.
Figure 7:
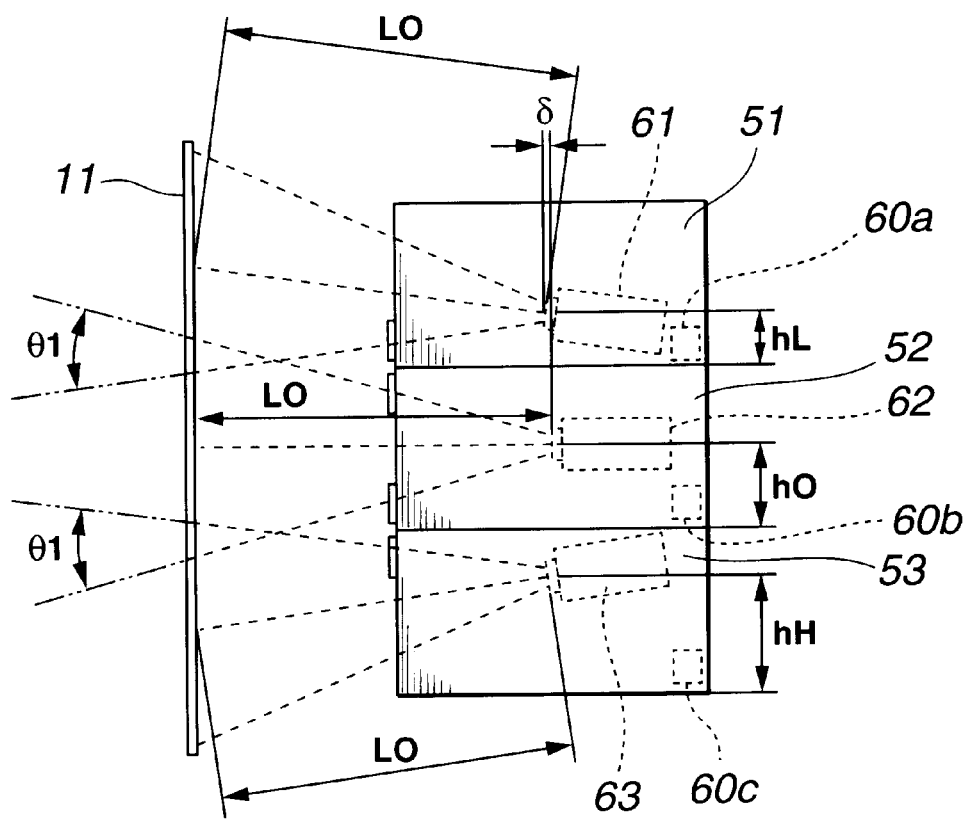
FIG. 7 is a side view of the configuration of part of a multivision device of the present invention.
Figure 8:
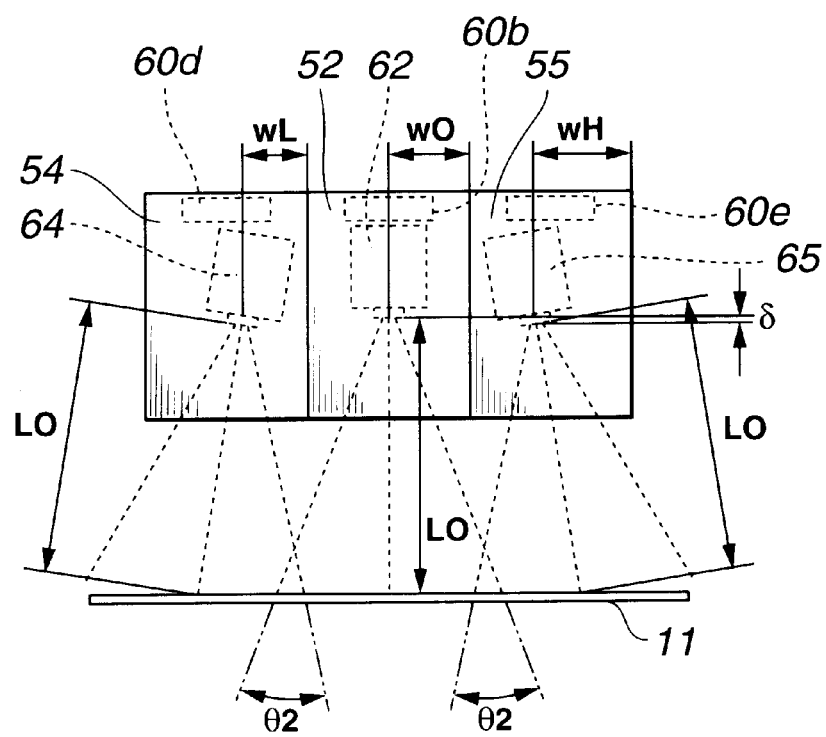
FIG. 8 is a plan view of the configuration of part of a multivision device of the present invention.
Figure 9:
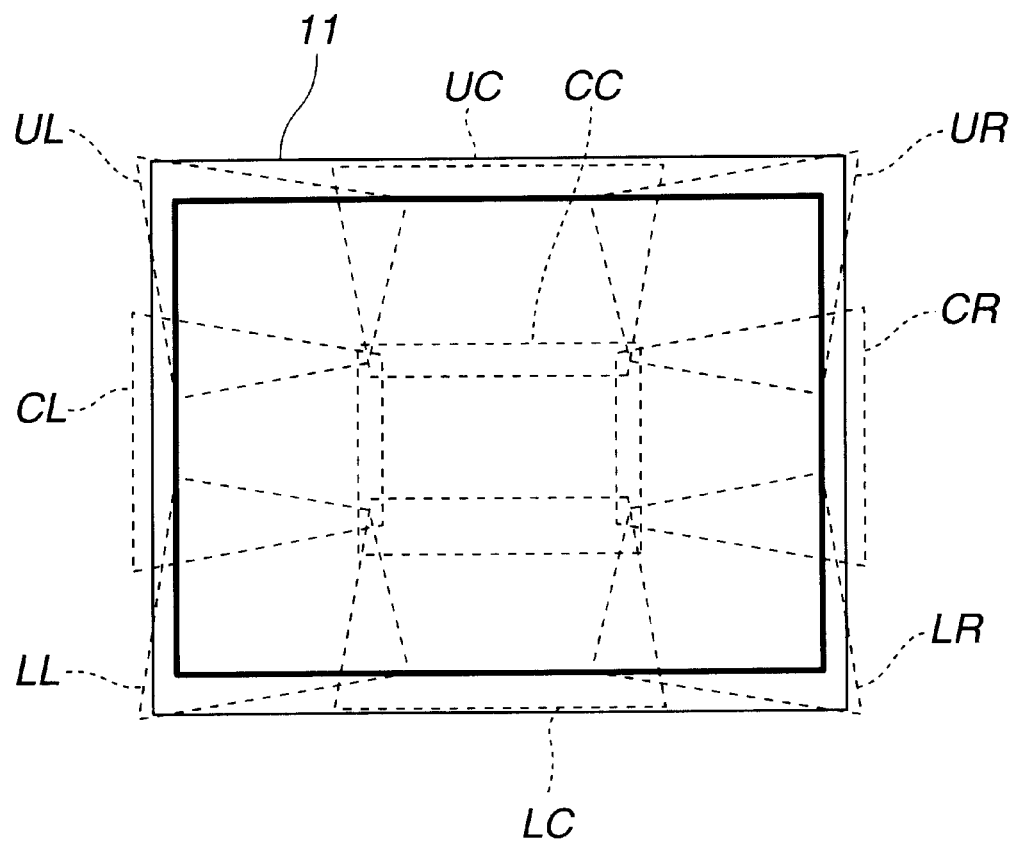
FIG. 9 explains the picture projected onto a screen by a multivision device of the present invention.

FIGS. 6 and 9 show a second aspect of the embodiment of a multivision device relating to the present invention. FIG. 6 is a perspective view of the general configuration of a multivision device equipped with a drive device on each projector that can adjust position and angle in horizontal and vertical directions. FIG. 6A is a block diagram showing the configuration of an electrical circuit that includes the drive device of FIG. 6. FIG. 7 is a side view of the configuration of part of this multivision device. FIG. 8 is a plan view of the configuration of part of this multivision device. FIG. 9 explains the picture projected onto the screen by this multivision device. In these figures, the light beams in optical systems that are the same as those in the aforementioned first aspect of the embodiment are omitted to simplify explanation and only the light beams of featured optical systems are shown.

The overall configuration of a multivision in this aspect of the embodiment is substantially the same as the configuration of the multivision device 1 in the aforementioned first aspect of the embodiment. However, it differs in that the projectors 16 that are built into each projection unit are mounted so that a drive device can adjust the position and projection direction of the projected light, that is the projection angle, in both horizontal and vertical directions. For example, the multivision device shown in FIG. 6 is a CUBE multivision device in which nine projection units 51 through 59 are arranged in a three across by three up (3×3) configuration.

Each of projection units 51 through 59 contains a rear projection type projector 61 through 69 built into the housing. And, although not shown in the diagrams, as in the aforementioned first aspect of the embodiment, shutter members are located within the housing as shown in FIG. 5 as is light-reducing member in front of the projection units as shown in FIGS. 4 and 5.

In this aspect of the embodiment, the positions of the projectors 61 through 69 contained inside projection units 51 through 59 move in both horizontal and vertical directions within the projection units 51 through 59 and their positions can be altered. Furthermore, there are drive devices 60a through 60i (not shown in FIG. 6) that enable the direction in which projected light is projected, that is the projection angle, to be changed in both vertical and horizontal directions. These drive devices 60a through 60i contain a rotary drive device, such as a motor, and a rotary power transmission mechanism. Because the rotary power for this motor is transmitted to the rotary power transmission mechanism, the height of the projectors within the projection units and the angle of the projected light can be freely adjusted in the vertical and horizontal directions. Some examples of such rotary transmission mechanisms are gear trains, chain gears, and cam-to-cam followers. Also, some examples of rotary drive devices are motors, linear motors, and ultrasonic motors.

As shown in FIG. 6A, in the circuit block the drive devices 60a through 60i in each projection unit 51 through 59 are controlled by a control device 10A installed either inside or outside the aforementioned multivision device. This enables the position and projection direction of each projector 61 through 69 to be easily changed.

The featured configuration and actions of this aspect of the embodiment will now be explained separately for the vertical and horizontal directions.

As shown in FIG. 7, the vertical positional relationship between the screen 11 and the stacked projection units 51 through 53, in the multivision device of this aspect of the embodiment, satisfies the relationships in Equations (1), (2), and (3) in the aforementioned first aspect of the embodiment. Likewise, the vertical row of projection units 56, 54, and 58, and the vertical row of projection units 57, 55, and 59 satisfy those relationships.

In such a multivision device 1, if the angle θ1 between the light projections onto a overlap is large, any mismatch in the intensity of light caused by the direction in which a picture is viewed becomes very obvious. That is, the effect of directivity is felt. This effect can be reduced if a highly diffuse screen is used but generally, on highly diffuse screens the intensity of output light is much weaker than that of input light. Therefore, in this aspect of the embodiment, the position of the projectors 61 through 69 in the projection units 51 through 59 are configured so that they can be adjusted between, for example, three levels by the aforementioned drive devices 60$a$ through 60$i$. In addition, they are configured so that the angle of the projectors can be adjusted to reduce the angle $\theta$ between adjoining light projections.

For example, when the height of projector 62 from the bottom of projection unit 52 located in the center is h0, the height hL of the projector 61 inside the upper projection unit 51 satisfies h0>hL. The control device 10A controls the drive device 60$a$ of the projection unit 51 so that light from projector 61 is projected upwards and adjusts the position and angle of projector 61. Also, the height hH of projector 63 in projected unit 53, which is located in the bottom row, satisfies hH>h0. The control device 10A controls the drive device 60$c$ of projection unit 53 so that the light from projector 63 is projected downwards and adjusts the angle and position of projector 63.

With this type of installation, the angle $\theta 1$ between light projections on the overlaps can be made much smaller than in the aforementioned first aspect of the embodiment, and the effects of directivity described above reduced.

On the other hand, the horizontal positional relationship between the screen and projection units 54, 52, and 55, which are lined up horizontally in the multivision device in this aspect of the embodiment, also satisfies Equations (2), (4), and (5) in the first aspect of the embodiment. In the same way, the row of projection units 56, 51, and 57 and the row of projections units 58, 53, and 59 also satisfy those relationships.

Thus, in this type of multivision device 1, when the angle $\theta 2$ of the light projections on the overlaps is large, as in the vertical direction, any mismatch in the intensity of light caused by the direction in which a picture is viewed becomes very obvious. That is, the effect of directivity is felt. This effect can be reduced if a highly diffuse screen is used in conjunction with lenticular lenses but generally, on highly diffuse screens the intensity of output light is much weaker than that of input light.

Therefore, in this aspect of the embodiment, the horizontal position of rear projection projectors 61 through 69 in projection units 51 through 59 and the direction of the projected light, that is the projection angle, can be adjusted between, for example, three levels using the aforementioned drive devices 60$a$ through 60$i$ to make this angle $\theta 2$ smaller.

For example, when the distance from the right of the housing of a rear projection projector 62 in projection unit 52, which is positioned in the center, is w0 (distance from housing in a horizontal direction), the control device 10A implements control to increase the distance (wH) of projector 65 in projection unit 55, which is to the right of projection unit 52, from the right of the housing. In other words, projector 65 faces away from the center so that wH>w0. Furthermore, the control device 10A controls and changes the drive device 60$e$ of projection unit 55 so that the projector 65 project light outwards and maintains this changed status. Also, control device 10A controls projector 64 within projection unit 54, which is to the left of projection unit 55, to decrease its distance wL from the right of the housing in the horizontal direction and away from the center so that wL<w0. The control device 10A also controls and changes the drive device 60$d$ of the projection unit 54 so that the projector 64 projects light outwards, and maintains this status.

Installation in this way enables the angle $\theta 2$ between light projections onto the overlapping sections to be greatly reduced when compared to the aforementioned first aspect of the embodiment and the effect of directivity described above to be reduced.

Furthermore, in this aspect of the embodiment, as shown in FIGS. 7 and 8, if the center projector 62 is regarded as the center, then projectors 61 and 63 through 69 within the surround projection units face away from the center, sloping upwards or downwards or to the left or right. This means that they become further from the screen 11. When projection units face away from the center and slope up or down or to the left or right, drive control by the control device 10A adjusts each projector so that they move $\delta$ minutes towards the screen 11 and thus maintain a constant distance L0 from the center of the projected light exit to the screen. In other words, at least from the viewpoint of center projector 62, projectors 61 and 63 through 69, which slope up or down or to the left or right, can be moved in the direction of the screen.

In the multivision device of this aspect of the embodiment, when the projector position and projection angle are controlled as above, as shown in FIG. 9, only the center projector remains rectangular. However, the surrounding pictures projected from the other projectors become slightly warped upon projection. In FIG. 9, there are nine projected pictures. As shown by the dotted lines, three pictures UL, CL, and LL from the left, three UC, CC, and LC from the center, and three UR, CR, and LR from the right are projected on the screen.

However, in this aspect of the embodiment, the same image projection system as in the aforementioned first aspect of the embodiment is used to adjust these warps. In other words, the pictures in the status shown in FIG. 9 are photographed with photographic device 22 (FIG. 5), which does calibration photography, and the required parameters are calculated based on the image data obtained by the adjusting device. Based on the calculated parameters, the projected picture signals are adjusted and projected. This type of picture compensation processing enables the display of rectangular pictures with no warp, as enclosed by the thick line in FIG. 9.

Here, compared to projected pictures shown in the aforementioned first aspect of the embodiment (refer to FIG. 3), the overlaps are complex in shape. However, as explained above, light-reducing members 13, 14, and 15 can easily be adjusted even after the projection units have been stacked. Accordingly, the light-reducing members can be adjusted after calibration of the warping described above and so it is clear that a satisfactory picture can be obtained.

Accordingly, using this aspect of the embodiment, a multivision device is configured using projection units 51 through 59 which are equipped with drive devices 60$a$ through 60$i$ that can change the distance between the large screen 11 and each projector 61–69 in the projection unit housing and that can change the projection angles and position of the projectors 61–69 in both vertical and horizontal directions. This means that when the projection units 51–59 are stacked horizontally and vertically, the position of the projectors 61 through 69 within the housing is selected by their position in the stack. Because the direction of the projected light can be adjusted horizontally and vertically to make the angle between adjoining light projections smaller, the effect of directivity on overlapping parts of pictures can be reduced. Therefore, a large screen picture with no joints and with little directivity in overlapping sections can be obtained using a multivision system that is simple to install. Other actions and effects are as for the aforementioned first aspect of the embodiment.

Now, in this aspect of the embodiment a configuration of projection units in a three by three stack has been explained. However, this aspect of the embodiment can be applied for a multivision device configured with any combination of projection units arranged horizontally and vertically. The number of variable positions for projectors inside the projection units can be set according to the number of rows in the device.

Also, this aspect of the embodiment has been explained using a configuration with drive devices 60a through 60i that can adjust the position and angle of projectors 61 through 69 contained in projection units 51 through 59 in both horizontal and vertical directions. However, the multivision device can also be configured with an adjusting mechanism that can be used to manually adjust the position and angle of each projector. Also, the device has been configured so that the projection lenses on projectors 61 through 69 inside projection units 51 through 69 have a zoom function. This zoon function of projectors 61 through 69 can be used to reduce the directivity of overlapping sections.

Next, a third aspect of the embodiment will be explained.

Figure 10:
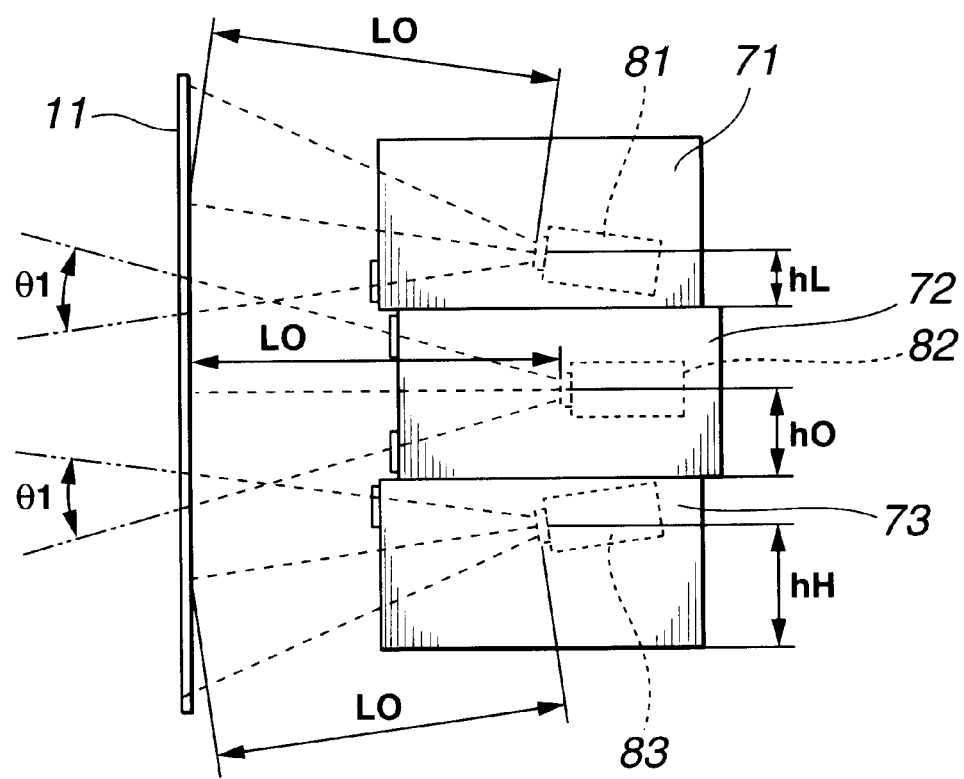
FIG. 10 shows a third aspect of the embodiment of the present invention and is a side view of the configuration of part of a multivision device when projection units are slightly staggered to maintain a constant distance between the units and the screen.
Figure 11:
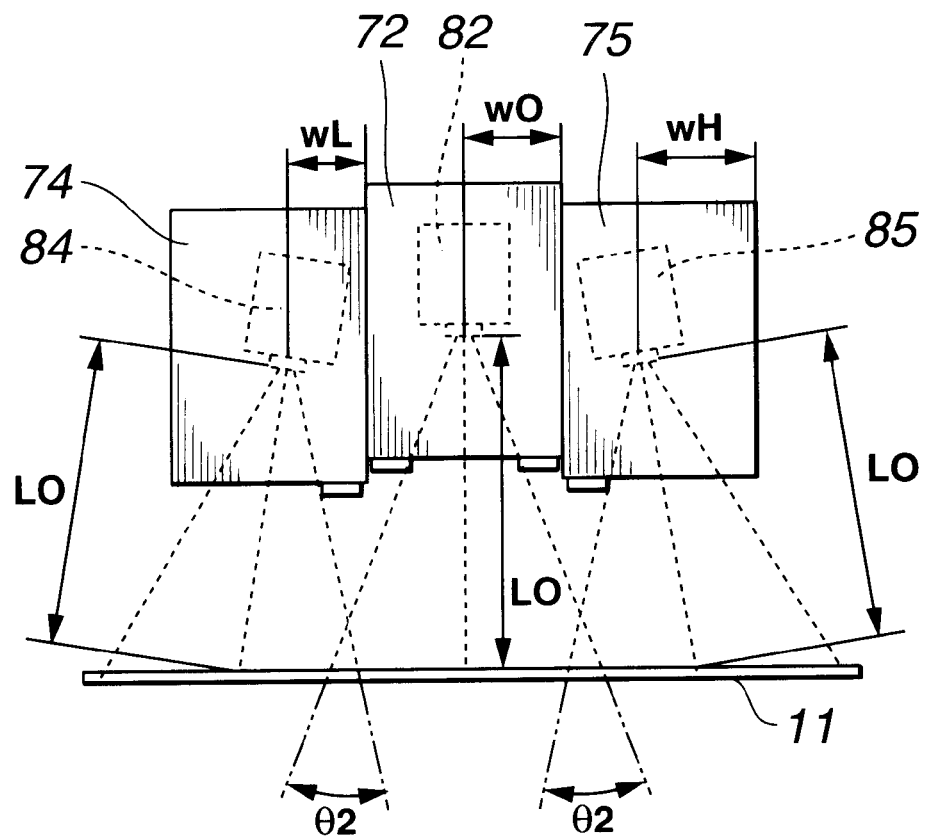
FIG. 11 is a plan view of the configuration of part of a multivision device of the present invention.
Figure 12:
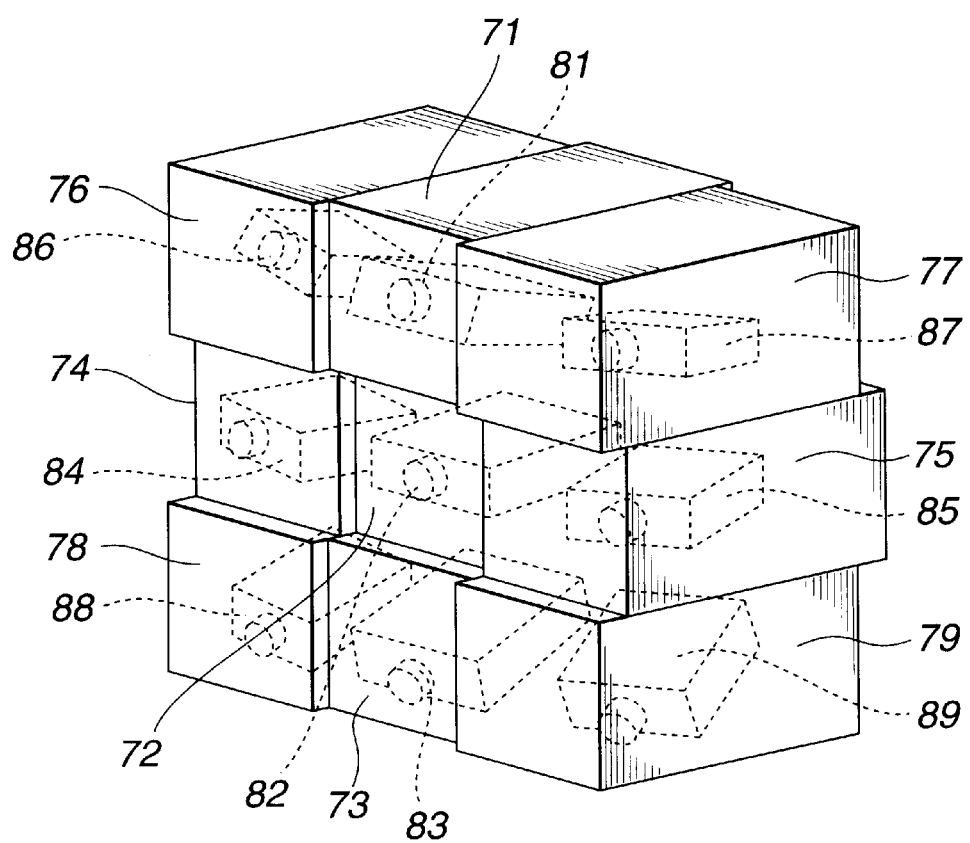
FIG. 12 is a perspective view of the general configuration of a multivision device of the present invention.

FIGS. 10 through 12 show a third aspect of the embodiment of a multivision device relating to the present invention. FIG. 10 is a side view of the configuration of part of a multivision device in which projection units are arranged so that they are offset from each other in order to maintain a constant distance between them and the screen without using drive devices 60a through 60i as explained in the second aspect of the embodiment. FIG. 11 is a plan view of the configuration of part of this multivision device. FIG. 12 is a perspective view of the general configuration of this multivision device. In these figures, light beams for optical systems that are the same as those in the aforementioned first and second aspects of the embodiment are omitted to simplify explanation and only the light beams of the featured optical system are shown.

In this aspect of the embodiment, by not installing drive devices in each projection unit as in the aforementioned second aspect of the embodiment but instead arranging the projection units so that they are slightly offset from each other, a constant distance between the units and the screen is maintained and the effect of directivity minimized. This simplifies the positioning mechanism within the projection units, lowers costs by eliminating the drive devices, and prevents incorrect assembly by installers. In other aspects, this configuration is the same as that in the aforementioned second aspect of the embodiment.

For example, the multivision device shown in FIG. 12 is a CUBE multivision device with nine projection units 71 through 79 stacked in a three horizontal by three vertical (3×3) configuration. Each of these units is slightly offset towards or away from the screen to maintain a constant distance between the screen and the centers of the light projection exits in projection units 71 through 79.

Each projection units 71 through 79 contains a rear projection projector 81 through 89 inside the housing. In addition, although not shown in the diagrams, the shutter members shown in FIG. 5 are placed inside the housing as are the light-reducing members shown in FIGS. 4 and 5 place in front of the projection units as in the aforementioned first aspect of the embodiment.

Next, the configuration and actions featured in this aspect of the embodiment will be explained separately for the vertical and horizontal directions.

As shown in FIG. 10, the vertical positional relationship within the multivision device 1 of this aspect of the embodiment between the screen 11 and stacked projection units 71 through 73, satisfies Equations (1), (2), and (3) in the aforementioned first aspect of the embodiment. Likewise, the vertical row of projection units 76, 74, and 78 and the vertical row of projection units 77, 75 and 79 also satisfy these relationships.

Thus, in this type of multivision device 1, when the angle θ1 between light projections onto the overlaps is large, the intensity of light becomes different depending on the direction in which a picture is viewed and the border becomes very obvious. That is, the pictured is subjected the effect of directivity. Therefore, in this aspect of the embodiment, as the second aspect of the embodiment, the multivision device 1 is configured with adjusting mechanisms (not pictured) that can adjust the height of projectors 81 through 89 in the projection units 71 through 79 between, for example, three levels without using a drive device.

If the height of projector 82 in projection unit 72, which is positioned in the center of the multivision device 1, is h0, the height hL of projector 81 in projection unit 71 on the top row satisfies h0>hL and the position of projector 81 is adjusted using an adjusting mechanism, which is not pictured, so that the light from projector 81 is projected upwards. This status is then maintained. Next, the height hH of projector 83 within projection unit 73 on the bottom row satisfies hH>h0 and the position of this projector 83 is adjusted using an adjusting mechanism, which is not pictured, so that the light from projector 83 is projected downwards.

By thus installing the multivision device 1, the angle θ1 between light projections onto the overlapping sections can be made much smaller than in the aforementioned first aspect of the embodiment, thus reducing the effects of directivity as described above.

On the other hand, as shown in FIG. 11, the horizontal positional relationship within the multivision device 1 between the screen 11 and projection units 74, 72, and 75, which are placed next to each other, satisfies Equations (2), (4), and (5) in the aforementioned first aspect of the embodiment. In the same way, the horizontal row of projection units 76, 71, and 77, and the horizontal row of projection units 78, 73, and 79 also satisfy these relationships.

Thus, in this type of multivision device, when the angle θ2 between the light projections onto the overlaps is large, any mismatch in the intensity of light caused by the direction in which a picture is viewed becomes very obvious. That is, the effect of directivity is felt. Therefore, in this aspect of the embodiment, as in the aforementioned second aspect of the embodiment, the multivision device is configured with adjusting mechanisms (not pictured) that can adjust the height of rear projection projectors 81 through 89 in the projection units 71 through 79 between, for example, three levels without using a drive device, for the purpose of decreasing the angle θ2.

If the distance between the horizontal position of projector 72 in projection unit 82, which is positioned in the center of the multivision device 1, and the right of the housing is w0, the distance wH in a horizontal direction between the right of the housing and the projector 85 in projection unit 75, which is next to the right, will be greater. In other words, projector 85 faces away from the center and wH>w0. Furthermore, an adjusting mechanism is used to adjust the positioning of the projector 85 and maintain its status. Next, the distance wL in the horizontal direction between the projector 84 inside projection unit 74 and the right of the housing is smaller and the projector 84 faces away from the center, satisfying wL<w0. An adjusting mechanism not shown in the diagrams is used to adjust the positioning of projector 84 so that the light is projected outwards and to maintain that status.

Installation in this way means that the angle θ2 between light projections onto overlapping sections is much smaller than in the aforementioned first aspect of the embodiment and that the effects of directivity can be reduced.

In this aspect of the embodiment, as shown in FIGS. 10 and 11, the central projector 82 is made the center of the device. Projectors 81, and 83 through 89 in the surrounding projection units face away from the center and light from them is projected either up or down or left or right. Therefore, they are further away from the screen 11. To maintain a constant distance L0 between the screen and these projectors, the projection units above and below projection unit 72, that is projection units 71 and 73 are placed further towards the screen than projection unit 72. In the horizontal direction, the three projection units 71, 72, and 73, in a vertical row are considered the center and the projection units to their left and right are placed further towards the screen. In other words, by installing the projection units using this arrangement, as shown in FIG. 12, the distance L0 between each of the projectors and the screen 11 is kept constant and that status can be maintained.

Accordingly, in this aspect of the embodiment, a multivision device is configured with projection units 71 through 79 that have variable projection angles in both horizontal and vertical directions and variable horizontal and vertical positions for each of the projectors in the housing. Accordingly, when projection units are stacked vertically and horizontally, the positions of projectors 81 through 89 within the housing are selected in accordance with the position of the projection units in the stack. An adjusting mechanism can then be used to simply adjust the direction of the projected light both horizontally and vertically to make the angle with the adjoining projected light smaller. The adjustment of the distance between the projectors and the screen is made by stacking the projection units so that some are closer to the screen than others. This enables the installation status from a viewer's eye level to be confirmed at installation and so prevents installation errors by workers. Furthermore, drive devices are not provided in each projection unit and so the cost is lower than for the aforementioned second aspect of the embodiment. Other actions and effects are the same as for the aforementioned first aspect of the embodiment.

This aspect of the embodiment has been explained for a three vertical by three horizontal configuration of projection units. However, it can also be applied in a multivision device configured with a combination of any number of projection units arranged vertically and horizontally. This is enabled by setting the number of variable levels of the projectors within the projection units in accordance with number of columns in the configuration, and setting the positional relationship between projection units in accordance with the number of levels.

Also, the first through third aspects of the embodiment relating to the present invention have been explained for a projection device in which a plurality of projection units are stacked. Of course, while not shown in the diagrams, this installation status is held by a fixing means between each of the projection units or fixing means that fixes the entire group of units and safety has been given due consideration. Also photographic devices and adjusting devices required in calibration photography can be installed either within or outside the multivision device. However, for ease of operations, it is preferable that they be accommodated within the multivision device.

Figure 13:
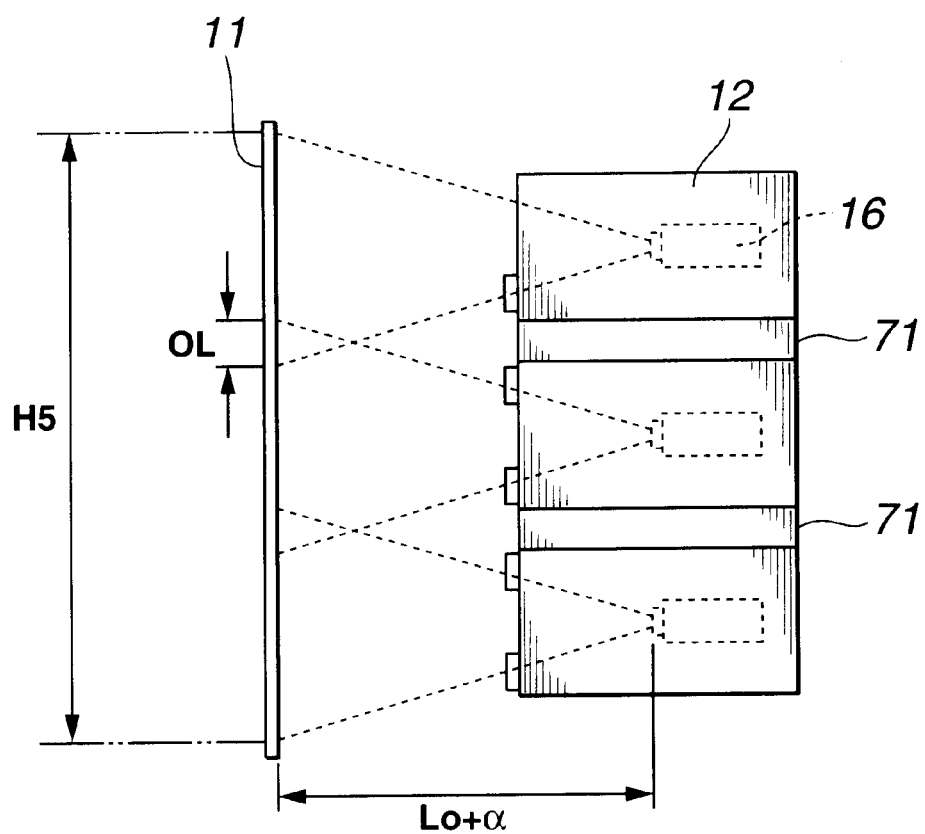
FIG. 13 is a side view of the configuration of part of a multivision device and is used to explain an example in which spacers are provided between projection units in a multivision device of the present invention and the pictures are enlarged for display.

In the first through third aspects of the embodiment, to increase the size of the picture projected onto the screen, spacers, as shown in FIG. 13, can be installed between the projection units. As shown in FIG. 13, the spacers 71, which are a mechanism for changing, that is adjusting the space between adjoining projection units, are installed between the projection units 12. If spacers 71 are provided between projection units 12 and the distance between the projectors 16 and screen 11 increased, the projected picture is enlarged without increasing the overlaps (OL) between light projection. The vertical length of the picture changes from H3, the length when spacers are not used, to H5. Here, spacers placed between projection units in a vertical direction are shown but they can also be placed horizontally. The size of the picture can be changed freely by changing the height or width of the spacers. Thus, if spacers are installed between projection units to increase the distance between projectors and the screen from L0 to (L0+α), the projected picture can be enlarged without increasing the overlaps (OL) between light projections. A mechanism by which the spacing between projection units can be either manually or automatically changed may also be added to adjust the spacing between projection units.

The present invention is not limited to the first through third aspects of the embodiment described above but combinations of these aspects and applications of these aspects can also be applied to the present invention.

As explained above, in the present invention, by configuring a multivision device so that one large screen picture can be created by overlapping adjoining projecting images on the screen, a highly precise picture without joints can be obtained and the position of light-reducing member can be simply adjusted. In addition, even when calibration photography using an image projection system is conducted, the effects of adjoining pictures can be removed and the calibration function in this picture projection system effectively used. Furthermore, if all the projection units are the same, by changing the projection direction of projectors inside projection units in accordance with the position of those projection units, which are stacked vertically and horizontally, a quality projected picture that appears to be projected from one light source can be obtained. This enables the provision of a high performance multivision device in which projected pictures are made more accurate.

What is claimed is:

1. A multivision device comprising:
   a projection device constituted by an array of a plurality of projection units each composed of a rear projection projector and a housing that supports this rear projection projector;
   a screen that is placed in isolation from said projection device and that displays pictures projected from said projection device; and
   positioning and support means for supporting said projection units and said screen and positioning said screen at a fixed distance from said projection units such that the pictures projected from adjoining ones of said projection units overlap on said screen and one picture is formed on said screen,
   wherein a light-reducing member is installed in each of said projection units to reduce the amount of projected light, and
   wherein the position in which said light-reducing member is mounted on said projection units is adjustable horizontally and vertically.

* * * * *